US007904561B2

(12) United States Patent
Chan et al.

(10) Patent No.: US 7,904,561 B2
(45) Date of Patent: Mar. 8, 2011

(54) BROKERING MOBILE WEB SERVICES

(75) Inventors: Edwin Chan, Richmond Hill (CA); Paul Ward, Waterloo (CA)

(73) Assignee: International Business Machines Corporation, Armonk, NY (US)

( * ) Notice: Subject to any disclaimer, the term of this patent is extended or adjusted under 35 U.S.C. 154(b) by 204 days.

(21) Appl. No.: 12/121,077

(22) Filed: May 15, 2008

(65) Prior Publication Data
US 2009/0287766 A1 Nov. 19, 2009

(51) Int. Cl.
*G06F 15/16* (2006.01)
(52) U.S. Cl. ............ 709/226; 709/203; 705/14.19; 705/14.2; 705/14.24; 705/14.25
(58) Field of Classification Search .......... 709/203, 709/226; 705/14.19, 14.2, 14.24, 14.25
See application file for complete search history.

(56) References Cited

U.S. PATENT DOCUMENTS

| | | | |
|---|---|---|---|
| 6,868,446 | B2 | 3/2005 | Hattori et al. |
| 6,898,635 | B2 | 5/2005 | Jung |
| 6,990,525 | B1 | 1/2006 | Ying et al. |
| 7,433,835 | B2 * | 10/2008 | Frederick et al. .......... 705/26 |
| 2002/0010771 | A1 * | 1/2002 | Mandato .................. 709/223 |
| 2004/0078424 | A1 * | 4/2004 | Yairi et al. .................. 709/203 |
| 2004/0117414 | A1 * | 6/2004 | Braun et al. ................ 707/204 |
| 2005/0021663 | A1 * | 1/2005 | Knauerhase et al. ......... 709/217 |
| 2005/0204054 | A1 | 9/2005 | Wang et al. |
| 2006/0004764 | A1 | 1/2006 | Kurhekar et al. |
| 2006/0136555 | A1 * | 6/2006 | Patrick et al. .................. 709/203 |
| 2007/0005777 | A1 * | 1/2007 | Fremantle et al. ............ 709/228 |
| 2009/0089365 | A1 * | 4/2009 | Serghi et al. .................. 709/203 |
| 2009/0132491 | A1 * | 5/2009 | Desaraju et al. .................. 707/3 |

FOREIGN PATENT DOCUMENTS

WO WO 2006/056534 A1 6/2006

OTHER PUBLICATIONS

Maximilien et al., "A Framework and Ontology for Dynamic Web Services Selection", pp. 84-93, 2004.
Perryea et al., "A Novel Service Community-Based Discovery Approach", pp. 1-24, Nov. 1, 2005.
Vilas et al., "An Architecture for Building Web Services with Quality-of-Service Features", WAIM04, HTTP://idtv.det.uvigo.es/pdfs/waim04.pdf.
Fedosseev, "Composition of Web Services and QoS Aspects", Seminar: Data Communication and Distributed Systems, WS 2003/2004, pp. 1-22.
Choi et al., "Ubiquitous Computing Services Discovery and Execution Using a Novel Intelligent Web Services Algorithm", Sensors 2007, vol. 7, pp. 1287-1305.
Wang et al., "A QoS-aware Selection Model for Semantic Web Services", ICSOC 2006, http://www.vitvar.com/!publications/ICSOC2006-WangVKT.pdf.

* cited by examiner

*Primary Examiner* — Wing F Chan
*Assistant Examiner* — Kostas Katsikis
(74) *Attorney, Agent, or Firm* — Ayla A. Lari; Hoffman Warnick LLC

(57) ABSTRACT

The invention provides a novel mobile web services discovery method that is capable of fulfilling the requirements from both the clients and providers. It allows the provider to balance the cost to performance ratios and utilize the network bandwidth more effectively, while also attaining the quality levels expected by the client.

20 Claims, 4 Drawing Sheets

BROKERING MOBILE WEB SERVICES

FIELD OF THE INVENTION

The present invention generally relates to web service matching/brokering. Specifically, the present invention relates to an approach for brokering web services based on fulfilling needs/requirements of clients, and optimizing profitability of service providers.

BACKGROUND OF THE INVENTION

At present, web services matching is primarily based on functional aspects. For example, a service client might want to specify attributes such as response time, security level, price, etc., in addition to the desired functional capabilities when searching for a service. Moreover, as a consequence of the rapid growth of mobile web services, the consumer now faces the question of how to select the most appropriate service from a variety of service providers. In such a scenario, QoS (quality of service) can serve as a key differentiator among service providers. Moreover, when a mobile web service provider offers services to a large number of consumers, it has to accommodate the diverse characteristics and needs of its consumers, and one way to address this issue is to offer web services with different QoS.

There exists a variety of research works on QoS-aware web services discovery, and they tend to focus solely on fulfilling the requirements of either the client or the provider. However, the interests of the provider and client are not equivalent. The provider's goal is to maximize its profit, and one way to achieve this is by minimizing its resource cost. On the other, the client's selection is determined by their own requirements which do not always reflect the real resource cost of the provider. This is particularly important to conserve resource consumption for both service client and provider in addition to fulfilling the client requirements, since system resources in a mobile environment, such as wireless network bandwidth, are precious.

SUMMARY OF THE INVENTION

The invention provides a novel mobile web services discovery method that is capable of fulfilling the requirements from both clients and providers. It allows the provider to balance the cost/performance ratios and utilize network bandwidth more effectively, while also attaining the quality levels expected by the client.

A first aspect of the present invention provides a method for brokering web services, comprising: receiving an inquiry containing client requirements for a web service from a client; identifying a set of services that meet the client requirements and that are most profitable to a set of service providers; determining whether the client meets technical requirements needed to implement each service of the set of services; discarding services from the set of services that have technical requirements that the client fails to meet to yield a candidate set of services; and returning the candidate set of services to the client.

A second aspect of the present invention provides a system for brokering web services, comprising: a module for receiving an inquiry containing client requirements for a web service from a client; a module for identifying a set of services that meet the client requirements and that are most profitable to a set of service providers; a module for determining whether the client meets technical requirements needed to implement each service of the set of services; a module for discarding services from the set of services that have technical requirements that the client fails to meet to yield a candidate set of services; and a module for returning the candidate set of services to the client.

A third aspect of the present invention provides a program product stored on a computer readable medium for brokering web services, the computer readable medium comprising program code for causing a computer system to: receive an inquiry containing client requirements for a web service from a client; identify a set of services that meet the client requirements and that are most profitable to a set of service providers; determine whether the client meets technical requirements needed to implement each service of the set of services; discard services from the set of services that have technical requirements that the client fails to meet to yield a candidate set of services; and return the candidate set of services to the client.

A fourth aspect of the present invention provides a method for deploying an application for brokering web services comprising: deploying a computer infrastructure being operable: receive an inquiry containing client requirements for a web service from a client; identify a set of services that meet the client requirements and that are most profitable to a set of service providers; determine whether the client meets technical requirements needed to implement each service of the set of services; discard services from the set of services that have technical requirements that the client fails to meet to yield a candidate set of services; and return the candidate set of services to the client.

BRIEF DESCRIPTION OF THE DRAWINGS

These and other features of this invention will be more readily understood from the following detailed description of the various aspects of the invention taken in conjunction with the accompanying drawings.

Figure 1:
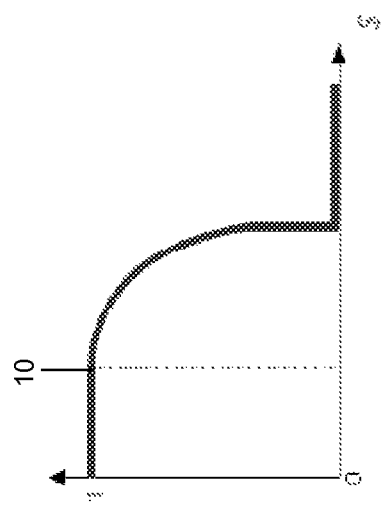
FIG. 1 depicts a graph of utility function versus cost for a mobile web service according to an embodiment of the present invention.

The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

The invention provides a novel mobile web services discovery method that is capable of fulfilling requirements from both clients and providers. It allows the provider to balance the cost/performance ratios and utilize the network bandwidth more effectively, while also attaining the quality levels expected by the client.

There are many advantages of using this invention over the known solutions described above. Many services and their corresponding QoS influence user satisfaction. The utility functions created by this invention allow different QoS dimensions to be evaluated effectively, and the preferences from the clients and providers can be easily taken into consideration. Moreover, different QoS dimensions may be conflicting (i.e., improving one may degrade another), and clients/providers with different priorities may have conflicting QoS preferences. The utility functions used by the present invention enable fine-grain trade-off analysis without relying on simplified assumptions (e.g., some predetermined constraints). Furthermore, different application scenarios require different algorithmic approaches for service evaluation.

The present invention provides the flexibility to accommodate various mobile client applications by permitting users to change the utility functions according to their preferences. Further, the invention is capable of balancing the requirements from both the clients and providers in the mobile environment. Not only do the utility functions help users preserve device-resource consumption, they also help service providers in situations when they are faced with excessive workload. For instance, if a provider is running low on resources and needs to provide multiple services, then the provider must arbitrate which service is given preference and receives additional resources, and from which service they are taken. In order to be able to arbitrate, the provider can use the utility functions to compute the marginal benefits of allocating resources to one service or another.

The methodology performed by a service broker during service discovery in accordance with an embodiment of the present invention can include:

1. A client first submits a service inquiry (e.g., a SOAP (simple object access protocol) message) that includes functional and quality requirements (also referred to as "client requirements") to the broker.

2. Upon receiving the inquiry, the broker consults one or more UDDI (universal description, discovery and integration) registries. WSDL (web services Description Language) files for services are then checked and available offers are built.

3. The broker applies the service selection process on the newly created offer list to find the service that best matches client requirements while also being least costly for providers. The details of the service selection process are elaborated further in a later section. From this, the broker develops a set (e.g., one or more) of services that meet the client requirements.

4. For each service in the set, the broker requests the service description (operations provided, parameters, etc.) from the provider, and this information is forwarded via an encoded SOAP message to the client application that resides at mobile devices. The client application processes the received information and displays it to the mobile user.

5. The client invokes a service based on the information (web service name, selected operation, parameter values, etc.) sent by the broker. The methodology of QoS-based service selection can be as follows. For each mobile web service that fulfill the user's functional requirements, the QoS information is retrieved from the tModel registered in the UDDI. Then, the broker examines whether the mobile device meets the hardware requirements of the service. Information about the CPU processing power, memory and video resolution of the device are compared with the advertised requirement of the web service. If any of the device's attributes is less than the requirement suggested by the provider, then the service is eliminated from the candidate set. Afterwards, the broker applies a set of utility functions (detailed below) to rank the candidate web services.

User benefits together with provider's cost contribute to the evaluation of a service through a utility function:

Service Utility=User Benefit×$w1$+Provider Benefit×$w2$ where $w1+w2=1$, and $w1$ and $w2$ must be greater than 0 and less than 1. Since both user benefit and provider's benefit fall in between [0...1], therefore service utility falls in between [0...1].

The utility function introduces two variants, which are set by the service broker. The first variant minimizes cost for a given level of effectiveness (i.e., user benefit). By setting $w2=1$ and specifying QoS requirements in its service discovery request, a client can find the cheapest service for a given user benefit determined by its QoS requirements. The second variant maximizes effectiveness for a given level of cost. By setting $w1=1$ and specifying the reserve price in its service discovery request, the broker can find the service with highest user benefit at an expected cost. The third variant is finding a tradeoff between effectiveness and cost, and can be realized by giving $w1$ and $w2$ various values other than 0. The flexibility in expressing different preferences makes the above utility function a better choice than a benefit-cost ratio.

Figure 2:
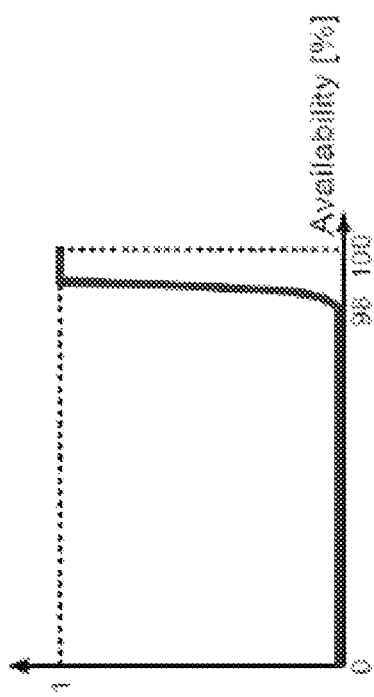
FIG. 2 depicts a graph of utility function verses availability according to an embodiment of the present invention.

Utility functions can be used to measure the degree of satisfaction with a particular QoS attribute. Each QoS attribute has its own utility function, some of which are highlighted below. The utility function associated with the criterion price is:

$Score(P(r)) = 0$,   $P(r)$ > maximum price client is willing to pay,
$Score(P(r)) = 1$   $P(r)$ <= minimum price client is willing to pay where $P(r)$ is the price charged by a provider r for executing the web service, which is obtained from the monetary cost metrics. Curve fitting techniques such as polynomial interpolation can be used to plot the curve between the two points to produce the utility function curve below. The above utility function can also be applied for the criteria message size, device power consumption, CPU/memory consumption on the server, etc. Specifying the minimum/maximum price he/she is willing to pay for the service helps to determine accurately the degree of user's satisfaction with the offered price, and also enables providers to determine the price-sensitivity of the service and derive the optimal price point. FIG. 1 shows a graph of utility function versus price with point 10 indicating an optimal price point. The utility function associated with the criterion availability is indicated as follows:

$Score(A(s)) = 0$,   $r$ < user-specified availability requirement
$Score(A(s)) = A(s)/A(u)$,   $r$ >= user-specified availability requirement
$Score(A(s)) = 1$,   $r$ > 99.9%

Where $A(u)$ is user-specified availability requirement, and $A(s)$ is the observed service availability. A score of 1 is achieved when the service availability exceeds 99.9%, and is 0 when it is less than the user-specified availability requirement. A similar utility function can be used for the criterion reputation. The resulting utility function curve is produced by interpolating the salient points and is shown in FIG. 2.

The utility function associated with the criterion security is:

| Score(Se(s)) = 1, | service meets the security requirement |
|---|---|
| Score(Se(s)) = 0, | service does not meet the security requirement |

Figure 3:
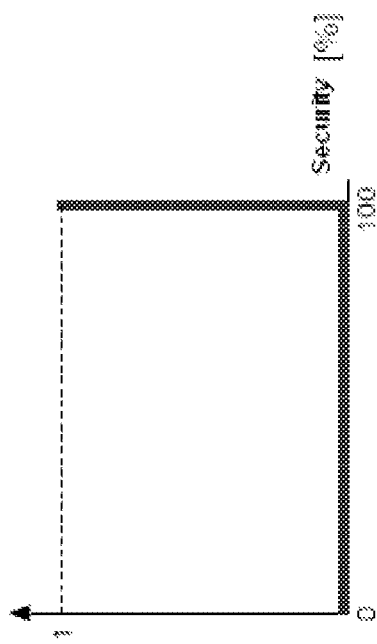
FIG. 3 depicts a graph of utility function verses security according to an embodiment of the present invention.

A graph of utility function versus security is shown in FIG. 3.

Figure 4:
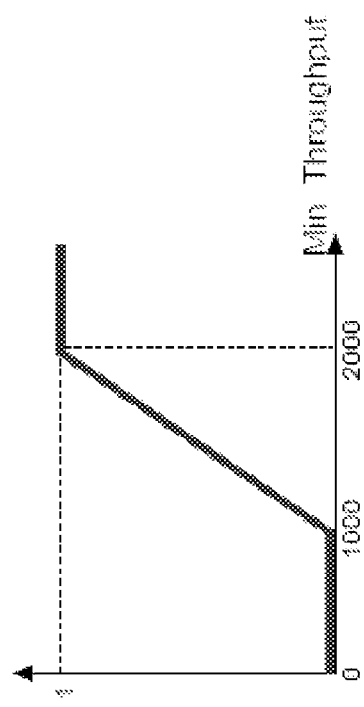
FIG. 4 depicts a graph of utility function verses minimum throughput according to an embodiment of the present invention.

For attributes such as throughput and bandwidth, the framework allows clients to arbitrarily decide the rate that he/she believes is sufficient or useless for the application. Similarly, the provider can arbitrarily decide the bandwidth and throughput that is too costly or very inexpensive to provide. Using these two salient points, a curve fitting technique selected by the user (i.e., linear, polynomial, etc.) can be applied to generate the utility function curve. For example, if a client thinks a throughput rate of 1,000 requests/seconds or below is useless and any throughput of 2,000 or more requests/second is perfect, then the utility function curve of FIG. 4 may be generated.

Figure 5:
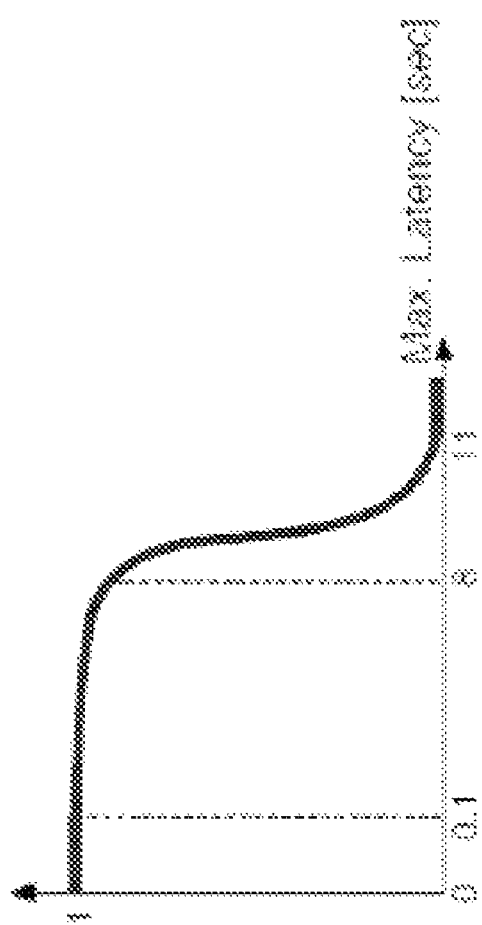
FIG. 5 depicts a graph of utility function versus maximum latency according to an embodiment of the present invention.

For latency, it should be understood that mobile web services response times can affect user experience. In this framework, the client can specify a mobile web services response time threshold. When the service fails to respond within this threshold, the client may become frustrated, and therefore the service has a utility score of 0. The client can also specify the response time that gives clients the feeling of instantaneous response. Any response time below this period should have a utility score of 1. The framework interpolates between these two points to obtain the latency utility function curve of FIG. 5. For example, if the client specifies 8-11 seconds as the response time threshold, and 0-100 milliseconds as the time that gives him/her the instantaneous response, then the latency utility curve shown in FIG. 5 is produced.

Based on utility scores and relative importance of the client-specified QoS requirements, the broker computes the overall user benefit score of the service to the client using the following sum.
User Benefit=

$$\sum_{i=1}^{n}(Si \times Wi)$$

Where n is the total number of QoS attributes evaluated, $s_i$ is the score from the criteria QoS attribute's utility function, and $w_i$ denotes the client's assigned relative importance to the attribute. The sum of $w_i$ is equal to 1, and the value of $s_i$ is normalized. The QoS attributes used to determine user benefit can include monetary cost, availability, reputation, throughput, device power consumption, latency, video resolution, and security.

The provider's benefit measures the overhead for a service provider to host a service. The QoS metrics that are classified into the provider's resource category, such as message size, CPU/memory consumption on the server, and the amount of bandwidth required, etc., are all factored in when calculating the provider's benefit. Furthermore, as various resources may bear different importance to the service host, relative importance is used to characterize the criticality of the various resources. The provider's benefit thus can be derived from the consumption of each resource and its relative importance by the following equation.

$$\sum_{x=1}^{n}(d_r \times w_r)$$

$w_r$ refers to the relative importance of resource r specified by the provider. The sum of $w_r$ is equal to 1, and the value of utility score $d_r$ falls into [0. . . 1].

Using the above utility function, the services are ranked according to the highest score. The service with the highest utility is ranked first. If there is a tie, the winner is randomly chosen among the services with the highest utility. Finally the broker returns a set of suggested service to the client ranked based on overall QoS evaluation.

Figure 6:
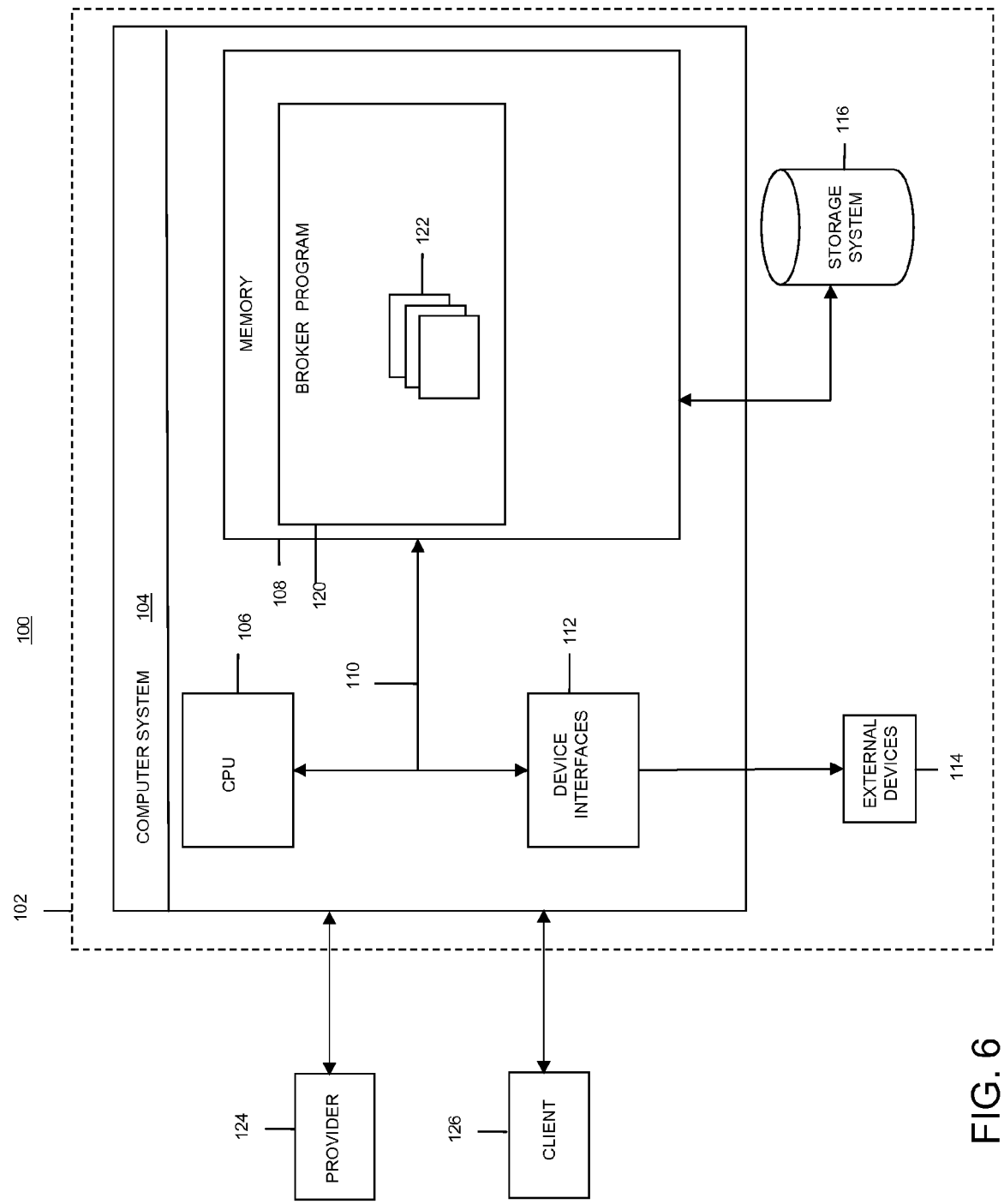
FIG. 6 depicts a more specific computerized implementation according to an embodiment of the present invention.

Referring now to FIG. 6, a computerized implementation 100 of an embodiment of the present invention is shown. As depicted, implementation 100 includes computer system 104 is deployed within a computer infrastructure 102. Computer system 104 is intended to represent the broker as described above. This is intended to demonstrate, among other things, that the present invention can be implemented within a network environment (e.g., the Internet, a wide area network (WAN), a local area network (LAN), a virtual private network (VPN), etc.), or on a stand-alone computer system. In the case of the former, communication throughout the network can occur via any combination of various types of communications links. For example, the communication links can comprise addressable connections that may utilize any combination of wired and/or wireless transmission methods. Where communications occur via the Internet, connectivity can be provided by conventional TCP/IP sockets-based protocol, and an Internet service provider can be used to establish connectivity to the Internet. Still yet, computer infrastructure 102 is intended to demonstrate that some or all of the components of implementation 100 can be deployed, managed, serviced, etc. by a service provider who offers to implement, deploy, and/or perform the functions of the present invention for others. In addition, although computer system/broker 104 is depicted as a single computer system, this need not be the case; the broker can be implemented as multiple computer systems.

As shown, computer system/broker 104 includes a processing unit 106, a memory 108, a bus 110, and device interfaces 112. Further, computer system/broker 104 is shown as including external devices 114 and storage system 116. In general, processing unit 106 executes computer program code, such as broker program 120, which is stored in memory 108 and/or storage system 116. While executing computer program code, processing unit 106 can read and/or write data to/from memory 108, storage system 116, and/or device interfaces 112. Bus 110 provides a communication link between each of the components in computer system/broker 104. Although not shown, computer system/broker 104 can also include I/O interfaces that communicate with: one or more external devices such as a cash broker, a keyboard, a pointing device, a display, etc.; one or more devices that enable a user to interact with computer system/broker 104; and/or any devices (e.g., network card, modem, etc.) that enable computer system/broker 104 to communicate with one or more other computing devices.

Computer infrastructure 102 is only illustrative of various types of computer infrastructures for implementing the invention. For example, in one embodiment, computer infrastructure 102 comprises two or more computing devices (e.g., a server cluster) that communicate over a network to perform the various process of the invention. Moreover, computer system/broker 104 is only representative of various possible computer systems that can include numerous combinations of hardware. To this extent, in other embodiments, computer system/broker 104 can comprise any specific purpose computing article of manufacture comprising hardware and/or computer program code for performing specific functions, any computing article of manufacture that comprises a combination of specific purpose and general purpose hardware/software, or the like. In each case, the program code and hardware can be created using standard programming and engineering techniques, respectively. Moreover, processing unit 106 may comprise a single processing unit, or be distributed across one or more processing units in one or more locations, e.g., on a client and server. Similarly, memory 108 and/or storage system 116 can comprise any combination of various types of data storage and/or transmission media that reside at one or more physical locations. Further, device interfaces 112 can comprise any module for exchanging information with one or more external devices 114. Still further, it is understood that one or more additional components (e.g., system software, math co-processing unit, etc.) not shown in FIG. 6 can be included in computer system/broker 104.

Storage system 116 can be any type of system capable of providing storage for information under the present invention. To this extent, storage system 116 can include one or more storage devices, such as a magnetic disk drive or an optical disk drive. In another embodiment, storage system 116 can include data distributed across, for example, a local area network (LAN), wide area network (WAN) or a storage area network (SAN) (not shown). In addition, although not shown, additional components, such as cache memory, communication systems, system software, etc., may be incorporated into computer system/broker 104.

Shown in memory 108 of computer system/broker 104 is broker program 120, which includes a set (at least one) of modules 122. The modules 122 generally provide the functions of the present invention as described herein. For example (among other things), the set of modules 122 is configured to provide and/or enable the following: receiving an inquiry containing client requirements for a web service from a client; identifying a set of services that meet the client requirements and that are most profitable to a set of service providers; determining whether the client meets technical requirements needed to implement each service of the set of services; discarding services from the set of services that have technical requirements that the client fails to meet to yield a candidate set of services; returning the candidate set of services to the client; for consulting a set of UDDI registries and WSDL files to identify the set of services; sending an informational message about each service of the candidate set of services to the client; receiving an invocation of at least one service of the candidate set of services from the client, etc.

While shown and described herein as a mobile web service brokering solution, it is understood that the invention further provides various alternative embodiments. For example, in one embodiment, the invention provides a computer-readable/useable medium that includes computer program code to enable a computer infrastructure to provide mobile web service brokering. To this extent, the computer-readable/useable medium includes program code that implements each of the various process of the invention. It is understood that the terms computer-readable medium or computer useable medium comprises one or more of any type of physical embodiment of the program code. In particular, the computer-readable/useable medium can comprise program code embodied on one or more portable storage articles of manufacture (e.g., a compact disc, a magnetic disk, a tape, etc.), on one or more data storage portions of a computing device, such as memory 108 and/or storage system 116 (e.g., a fixed disk, a read-only memory, a random access memory, a cache memory, etc.), and/or as a data signal (e.g., a propagated signal) traveling over a network (e.g., during a wired/wireless electronic distribution of the program code).

In another embodiment, the invention provides a business method that performs the process of the invention on a subscription, advertising, and/or fee basis. That is, a service provider, such as a Solution Integrator, can offer to provide mobile web service brokering. In this case, the service provider can create, maintain, and support, etc., a computer infrastructure, such as computer infrastructure 102 that performs the process of the invention for one or more customers. In return, the service provider can receive payment from the customer(s) under a subscription and/or fee agreement and/or the service provider can receive payment from the sale of advertising content to one or more third parties.

In still another embodiment, the invention provides a computer-implemented method for mobile web service brokering. In this case, a computer infrastructure, such as computer infrastructure 102, can be provided and one or more systems for performing the process of the invention can be obtained (e.g., created, purchased, used, modified, etc.) and deployed to the computer infrastructure. To this extent, the deployment of a system can comprise one or more of: (1) installing program code on a computing device, such as computer system/broker 104, from a computer-readable medium; (2) adding one or more computing devices to the computer infrastructure; and (3) incorporating and/or modifying one or more existing systems of the computer infrastructure to enable the computer infrastructure to perform the process of the invention.

As used herein, it is understood that the terms "program code" and "computer program code" are synonymous and mean any expression, in any language, code or notation, of a set of instructions intended to cause a computing device having an information processing capability to perform a particular function either directly or after either or both of the following: (a) conversion to another language, code or notation; and/or (b) reproduction in a different material form. To this extent, program code can be embodied as one or more of: an application/software program, component software/a library of functions, an operating system, a basic device system/driver for a particular computing and/or processing device, and the like.

A data processing system suitable for storing and/or executing program code can be provided hereunder and can include at least one processor communicatively coupled, directly or indirectly, to memory element(s) through a system bus. The memory elements can include, but are not limited to, local memory employed during actual execution of the program code, bulk storage, and cache memories that provide temporary storage of at least some program code in order to reduce the number of times code must be retrieved from bulk storage during execution. Input/output or device devices (including, but not limited to, keyboards, displays, pointing devices, etc.) can be coupled to the system either directly or through intervening device controllers.

Network adapters also may be coupled to the system to enable the data processing system to become coupled to other data processing systems, remote printers, storage devices, and/or the like, through any combination of intervening private or public networks. Illustrative network adapters include, but are not limited to, modems, cable modems and Ethernet cards.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims.

We claim:

1. A method for brokering web services, comprising:
receiving by a computer hardware device an inquiry containing client requirements for a web service from a client;
identifying by the computer hardware device a set of services that meet the client requirements and that are most profitable to a set of service providers;
determining by the computer hardware device whether the client meets technical requirements needed to implement each service of the set of services;
discarding by the computer hardware device services from the set of services that have technical requirements that the client fails to meet to yield a candidate set of services;
returning by the computer hardware device the candidate set of services to the client;
evaluating by the computer hardware device a service utility of each of the set of services as a function of a user benefit and a service provider benefit; and
calculating by the computer hardware device the service provider benefit as a sum of: a plurality of service resource consumptions times a user assigned value for each service resource consumption.

2. The method of claim 1, wherein the web services comprise mobile web services.

3. The method of claim 1, further comprising:
consulting a set of UDDI registries and WSDL files to identify the set of services.

4. The method of claim 1, further comprising:
sending an informational message about each service of the candidate set of services to the client.

5. The method of claim 1, further comprising:
receiving an invocation of at least one service of the candidate set of services from the client.

6. The method of claim 1, further comprising:
calculating the user benefit as a sum of: a plurality of service attribute scores times a user assigned value for each service attribute score.

7. A system for brokering web services, comprising:
at least one computing hardware device including:
a module for receiving an inquiry containing client requirements for a web service from a client;
a module for identifying a set of services that meet the client requirements and that are most profitable to a set of service providers;
a module for determining whether the client meets technical requirements needed to implement each service of the set of services;
a module for discarding services from the set of services that have technical requirements that the client fails to meet to yield a candidate set of services;
a module for returning the candidate set of services to the client;
a module for evaluating a service utility of each of the set of services as a function of a user benefit and a service provider benefit; and
a module for calculating the service provider benefit as a sum of: a plurality of service resource consumptions times a user assigned value for each service resource consumption.

8. The system of claim 7, wherein the web services comprise mobile web services.

9. The system of claim 7, further comprising:
a module for consulting a set of UDDI registries and WSDL files to identify the set of services.

10. The system of claim 7, further comprising:
a module for sending an informational message about each service of the candidate set of services to the client.

11. The system of claim 7, further comprising:
a module for receiving an invocation of at least one service of the candidate set of services from the client.

12. The system of claim 7, further comprising:
a module for calculating the user benefit as a sum of: a plurality of service attribute scores times a user assigned value for each service attribute score.

13. A program product stored on a computer readable non-transitory medium for brokering web services, the computer readable non-transitory medium comprising program code for causing a computer system to:
receive an inquiry containing client requirements for a web service from a client;
identify a set of services that meet the client requirements and that are most profitable to a set of service providers;
determine whether the client meets technical requirements needed to implement each service of the set of services;
discard services from the set of services that have technical requirements that the client fails to meet to yield a candidate set of services;
return the candidate set of services to the client;
evaluate a service utility of each of the set of services as a function of a user benefit and a service provider benefit; and
calculate the service provider benefit as a sum of: a plurality of service resource consumptions times a user assigned value for each service resource consumption.

14. The program product of claim 13, wherein the web services comprise mobile web services.

15. The program product of claim 13, further comprising program code for causing the computer system to:
consult a set of UDDI registries and WSDL files to identify the set of services.

16. The program product of claim 13, further comprising program code for causing the computer system to:
send an informational message about each service of the candidate set of services to the client.

17. The program product of claim 13, further comprising program code for causing the computer system to:
receive an invocation of at least one service of the candidate set of services from the client.

18. The program product of claim 13, further comprising:
calculate the user benefit as a sum of: a plurality of service attribute scores times a user assigned value for each service attribute score.

19. A method for deploying an application for brokering web services comprising:
deploying a computer infrastructure being operable to:
receive an inquiry containing client requirements for a web service from a client;
identify a set of services that meet the client requirements and that are most profitable to a set of service providers;

determine whether the client meets technical requirements needed to implement each service of the set of services;
discard services from the set of services that have technical requirements that the client fails to meet to yield a candidate set of services;
return the candidate set of services to the client;
evaluate a service utility of each of the set of services as a function of a user benefit and a service provider benefit; and
calculate the service provider benefit as a sum of: a plurality of service resource consumptions times a user assigned value for each service resource consumption.

20. The method of claim 19, wherein the computer infrastructure is further operable to:
consult a set of UDDI registries and WSDL files to identify the set of services;
send an informational message about each service of the candidate set of services to the client; and
receive an invocation of at least one service of the candidate set of services from the client.

* * * * *